July 11, 1972  J. E. SHULTZ ET AL  3,676,025
ELECTRICAL IN-TANK FUEL PUMP
Filed April 23, 1970  2 Sheets-Sheet 1

United States Patent Office 3,676,025
Patented July 11, 1972

3,676,025
ELECTRICAL IN-TANK FUEL PUMP
John E. Shultz, Davison, Mich., and Wilfred W. Herderhorst, Fort Wayne, Ind., assignors to Tokheim Corporation, Fort Wayne, Ind.
Filed Apr. 23, 1970, Ser. No. 31,191
Int. Cl. F01d 5/10; F04b 17/00, 35/04
U.S. Cl. 417—423
17 Claims

ABSTRACT OF THE DISCLOSURE

An electrical motor and pump unit for mounting in an automotive or other combustion-engine fuel tank to pump liquid fuel to the engine. A circular regenerative fuel pump has its rotor on the armature shaft of a permanent-magnet motor mounted in a common cylindrical housing. Rotor blade spacing follows an orderly mathematical progression. The ferrite motor field magnet is a relatively thin-walled cylinder having large air-gap clearance from the armature and lying against the cylindrical housing which forms a return flux path. Full pump delivery flow passes through the large air gap, and hydraulic gain from improved flow through such air gap offsets any electrical loss. The use of a peripheral thin-wall magnet provides open interior space which permits a large commutator and brush contact area.

SUMMARY OF THE INVENTION

This invention relates to an electrical motor and pump unit adapted to be mounted in an automotive or other combustion-engine fuel tank to pump liquid fuel from such tank to the carburetor or other fuel-introducing system of the engine, as in a system such as that of U.S. Pat. No. 2,885,126. More particularly, the invention relates to a motor-pump unit of small physical size in which a circular impeller pump has its rotor driven by the extended armature shaft of a permanent magnet motor mounted with the fuel pump casing in a common cylindrical iron metal housing which provides a return flux path for the poles of the magnet. An inlet at one end of the unit supplies fuel to the pump, and pump delivery flow passes through the motor to a delivery outlet at the opposite end.

In accordance with the present invention, the motor field magnet is a relatively thin-walled ferrite cylinder which lies against the cylindrical housing and has relatively large air gap clearance from the armature, and full pump delivery flow is through such clearance. The large air gap is undesirable under conventional electrical practice, but it is found that any electrical loss from the large air gap is offset by hydraulic gain from improved flow efficiency. The combination gives overall output at least equal to that of an arrangement of equal size in which the permanent magnet has only a small air gap clearance from the armature and hydraulic flow is through passages at the outer periphery of the magnet, such as is shown in John E. Shultz et al. Pat. No. 3,418,991. The thin-walled cylindrical magnet used in the present invention not only improves the hydraulic flow characteristics of the pump, but is less expensive than the magnet used in that patent and is much better adapted for large scale manufacture to acceptable tolerance standards.

Further in accordance with the present invention, the motor-pump unit is made of components of inexpensive and efficient configuration which are assembled in sequence in the common cylindrical housing of magnetically permeable material. The pump is a regenerative pump having a rotor with circumferentially-spaced blades. These are unequally spaced in accordance with a mathematical formula, which avoids objectionable noise peaks at particular frequencies. The pump chamber is desirably defined at its periphery by an unobstructed circular wall to which the pump blades extend in close clearance relation, and is formed to provide annular regeneration spaces at each side of the rotor blade ring. Such spaces are obstructed by side strippers, disposed circumferentially between the inlet and outlet of the chamber. Use of side strippers and an unobstructed circular peripheral wall increases the permissible rotor diameter without increasing the casing diameter and without loss of pump efficiency. A pump driving hub on the motor shaft is shaped to freely enter a conforming central opening in the pump rotor and to center such rotor in operation. The cylindrical permanent magnet is desirably assembled in unmagnetized condition, and is magnetized through the housing wall after assembly to provide it with suitably oriented magnetic poles. The magnet may be notched to receive locating tangs on the adjoining brush carrier and pump housing but is otherwise a simple cylinder. This simplifies the magnet and its assembly. It also avoids problems of demagnetization, of handling magnetized magnets, and of collecting magnetic debris.

The use of the thin-walled permanent magnet and full pump delivery flow through the inside of such magnet permits the use of motor end parts of relatively simple configuration and allows ample integral space for the face commutator and its brushes. The commutator construction and through flow combine to increase the operating life of the motor-pump as a whole. Such life is largely determined by electrical erosion at the positive brush. The present commutator construction permits the use of thick segments, and the ample internal space permits large diameter segments. The segments can contain more metal, and can have large brush contact area. Full flow about them and the brush contact area gives better cooling and quenching. Such factors combine both to reduce the wear rate and to withstand greater wear, and thus to increase operating life.

The accompanying drawings illustrate the invention and show, as an example, a specific embodiment described below, representing the best mode presently contemplated for carrying out the invention. In such drawings.

Figure 1:
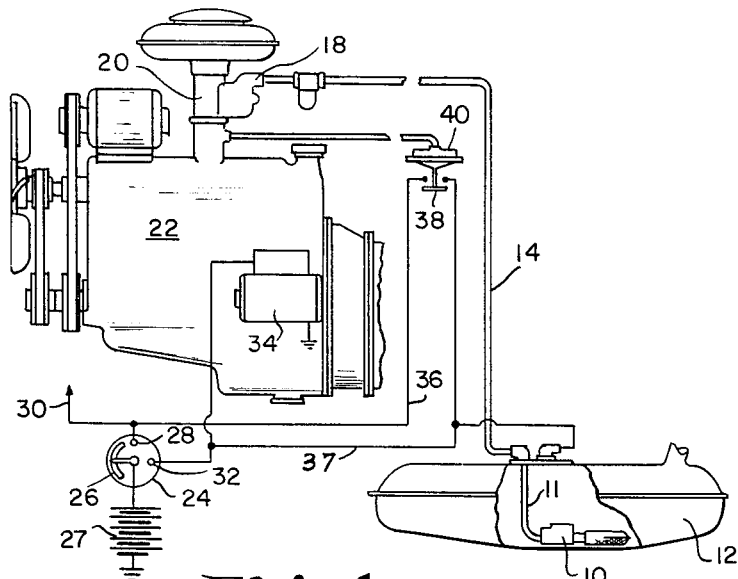
FIG. 1 is a somewhat schematic diagram of a fuel system of an automotive vehicle utilizing a motor pump unit in accordance with the invention.

The system shown in FIG. 1 includes a pump and motor unit 10 embodying the present invention, mounted by a depending tube 11, at the bottom of a fuel tank 12 and connected by a fuel line 14 to the float-controlled inlet valve 18 of the carburetor 20 for an automotive engine 22. The ignition system of the engine 22 is controlled by a key actuated switch 24 having a movable contact 26 connected to a battery 27 and having a fixed contact 28 connected to the ignition circuit 30. The switch may also have a second fixed contact 32 connected to the actuating relay for the engine starter 34. In normal running the movable contact 26 closes an ignition circuit to the first fixed contact 28. For starting, the movable contact 26 is moved beyond this normal running position to engage both the first contact 28 and the second fixed contact 32, and then closes both the ignition circuit and the starter relay circuit. The motor of the fuel pump 10 is energized in parallel with the ignition circuit 30 by a line 36 which preferably includes a switch that is responsive to engine operation. As shown, this switch is a normally open switch 38 actuated to closed position by a sensitive vacuum motor 40, responsive to intake vacuum of the engine 22. Desirably, the pump is also energized in response to starter actuation, through the line 37 connected in parallel with the starter relay circuit.

Figure 2:
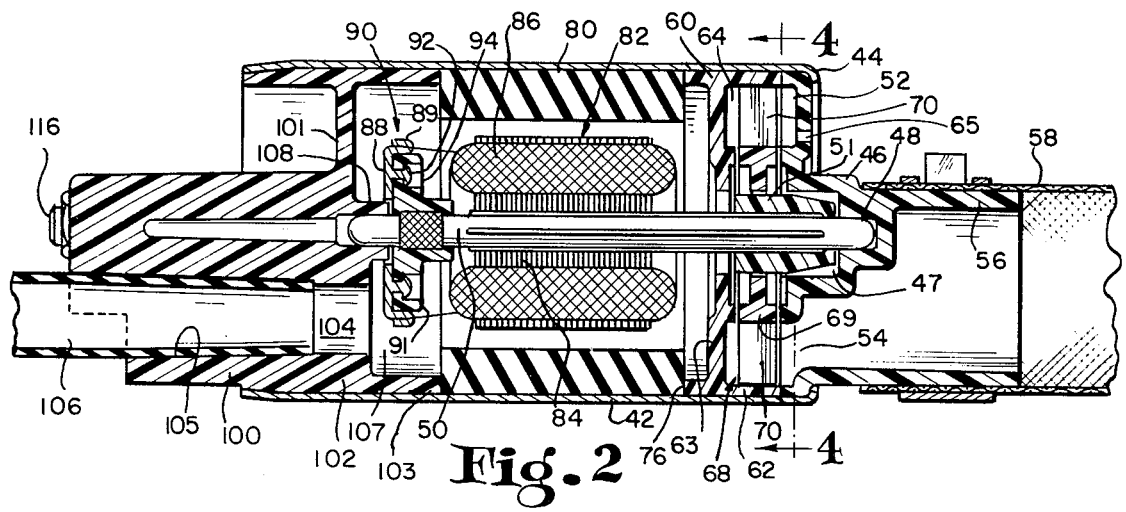
FIG. 2 is a vertical longitudinal section of a motor pump unit embodying the invention.
Figure 3:
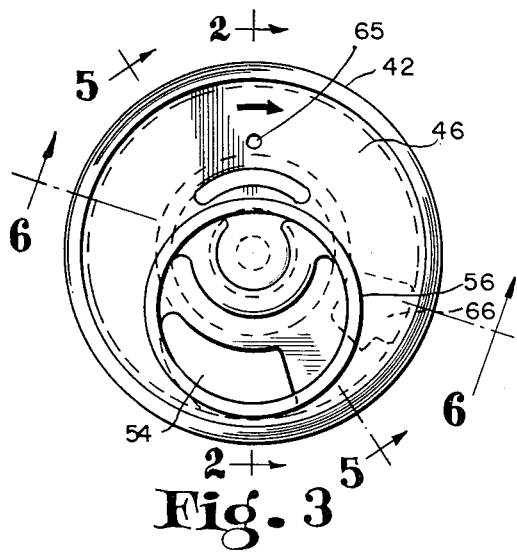
FIG. 3 is an end elevation, from the right of FIG. 2.

The motor pump unit shown in FIGS. 2–8 comprises an outer cylindrical housing 42, preferably of magnetic steel and suitably galvanized or otherwise coated to protect it from corrosion under the conditions in an automotive fuel tank. The end of the housing 42 shown at the right in FIG. 2 is formed inward to form a stop ring 44 against which the components of the motor pump unit are assembled. The end of the housing 42 adjacent to the stop ring 44 contains a pump end plate 46 formed at its center to provide a bearing 48 for the common motor and pump shaft 50. The inner face of the end plate 46 is shaped to form an annular side-regeneration cavity 52 for the pump. This communicates at the bottom of the assembly with an inlet passage 54 (FIGS. 2 and 3) leading from an enlarged inlet collar 56 connected to an inlet filter 58. The center of the end plate 46 forms a cavity 47 providing clearance for a drive hub 51 carried by the shaft 50.

A front pump housing plate 60 cooperates with the end plate 46 to form a pump housing. Such front plate 60 comprises an outer cylindrical wall 62 which defines the outer periphery of the pump chamber, and a radial wall 63 which is shaped to form a second annular side regeneration cavity 64 for the pump. This communicates, in the plane of FIG. 6, with an outlet opening 66 shown in FIG. 4 leading to the motor chamber. To interlock the two pump housing plates 46 and 60 in proper rotational orientation, the plate 46 carries a tongue 75 (FIGS. 4 and 5) which is received in a conforming notch in the peripheral wall 62 of the plate 60.

A pump rotor 68 is mounted for rotation on the axis of the shaft 50, between the end plate 46 and the radial wall 63 of the front plate 60. Such rotor 68 has a ring portion 69 disposed axially between locating end faces 55 on the plates 46 and 60, which ring supports pump blades 70 in the pump chamber. The rotor has a central flange 71 containing a central opening of regular polygonal shape, preferably hexagonal, for engagement over the driving hub 51 on the shaft 50. The hub 51 has a geometrically similar shape and is of a size to be freely received in the opening in the pump rotor web 71. The interengaging hexagonal shapes of the driving hub 51 and pump rotor 68 insure that in driving relation the rotor will be centered on a common axis with the hub 51 and its supporting shaft 50, and at the same time provide free engagement of the hub 51 in the pump rotor 68 during assembly. To facilitate such assembly engagement, the end of the hub 51 is desirably tapered, as shown. The free engagement of the hub 51 with the rotor 68 also permits the rotor to float in self-centering position between the faces 55. The close clearance between such faces and the rotor ring 69 defines a seal area between the pump chamber and the space inside the ring 69 which is open to motor chamber pressure.

Figure 4:
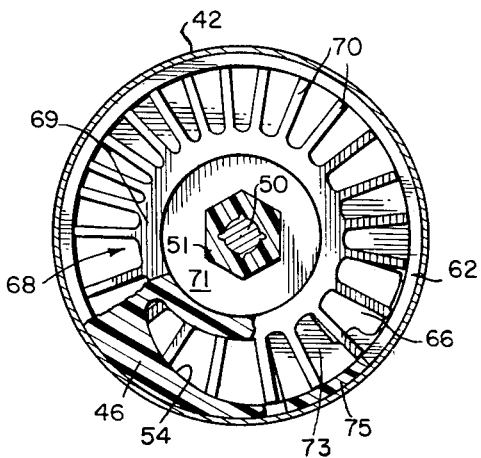
FIG. 4 is a transverse section, generally on the line 4—4 of FIG. 2.
Figure 6:
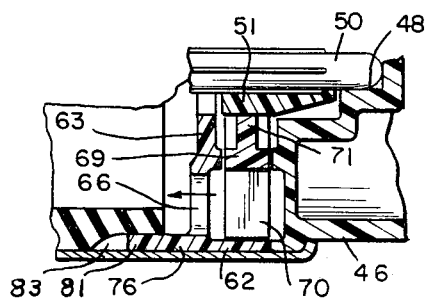
FIG. 6 is a partial section on line 6—6 of FIG. 3.

The pump is a regenerative pump, in which the blades 70 revolve in an annular pump chamber which includes the two side regeneration spaces formed by the cavities 52 and 64 at the sides of the pump rotor. Preferably, the ends of the blades 70 extend into close clearance relation with inner cylindrical face of the outer peripheral wall 62 of the front pump plate 60. While this close clearance provides no peripheral regeneration space beyond the ends of the blades 70, the extra blade length which this permits is found to improve pump performance. The pump chamber and side regeneration spaces extend without interruption from the inlet 54 (FIG. 2–4 clockwise in FIG. 4 to the outlet 66 (FIGS. 4 and 6). Circumferentially between the outlet 66 in the plane of FIG. 6 and the inlet 54 in the plane of FIG. 2, the side regeneration spaces are blocked by side stripper blocks 72 and 73 in the side cavities 52 and 64. As the blades revolve in the pump chamber, they carry the liquid about such chamber and produce a spiral circulation of liquid from the blade spaces into the regeneration spaces and back into the blades, so that the liquid is repeatedly acted on by the blades to generate pressure in the liquid. The stripper blocks lie in close clearance relation with the blades 70, and cause the pressurized liquid to be discharged through the outlet 66. For purposes of venting air and vapor from the pump chamber, a vent hole 65 may be provided through the end wall of the cavity 52, in a location at the inner periphery of the top portion of such cavity.

In order to improve the acoustic characteristics of the pump, and especially to avoid peak noise at a particular resonant frequency, and its harmonics, the series of blades 70 about the periphery of the rotor 68 are spaced from each other in an unequal but orderly spacing. The successive spaces between the blades are desirably in accordance with a mathematical series, such as a regular mathematical progression. A preferred spacing is in accordance with the arithmetical progression of the formula $$S(n) = 10° + \tfrac{1}{2}° \ (n-1)$$

where $n$ is the number of the blade in the series and $S(n)$ is the spacing of each blade $n$ from its successor in the series. The blade spacing in FIG. 8 follows such preferred spacing, but with the first blade omitted, which gives a total of 23 blades in the circumferential series with the spacing between blades in a regular progression from $10\tfrac{1}{2}°$ between the closest two blades to $21°$ between the most widely spaced two blades.

Figure 5:
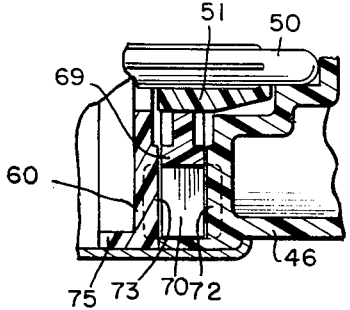
FIG. 5 is a partial section on line 5—5 of FIG. 3.

The peripheral wall 62 of the front pump plate 60 extends to the left as shown in FIGS. 2 and 5 into the pump chamber, to form a peripheral abutment seat 76 for the field magnet 80 of the motor which seat is circumferentially complete except only for the presence of a short tang 77 which projects into a short slot 79 in the end periphery of the magnet and which cooperates with a similar tank 81 and slot 83 at the other end of the magnet to rotationally orient the elements at opposite ends of the magnet.

The field magnet 80 is desirably a regular cylinder of ferrite material, having an outer circumferential surface which fits closely against the wall of the housing 42, and an inner circumferential surface of smooth and uninterrupted cylindrical shape. The magnet is a simple cylinder except only for the short slots 79 and 83 at its opposite outer ends. Within such magnet 80, the shaft 50 carries a motor armature 82 having a laminated core 84 and windings 86. The outside diameter of the armature 82 is substantially smaller than the inside diameter of the magnet 80, to provide a large air gap clearance between the armature 82 and the magnet 80. Such air gap is substantially larger than conventional practice in motor design and is desirably at least .035" on each side. In a representative embodiment of the invention, the armature 82 had an outside diameter of .75" and the magnet 80 had an inside diameter of .90", so that there was an air gap of .075" between the armature and magnet about the entire periphery of the armature. This provides a cross-section air-gap clearance area of .194 square inch, which is nearly three times the cross section area of a ⁵⁄₁₆-inch tubing such as is commonly used for the fuel line 14 from the pump to the carburetor (FIG. 1).

The windings 86 of the armature 82 are connected in conventional manner to contact segments 88 on a face commutator 90 mounted on a knurled section of the shaft 50. Such segments 88 are mounted on a molded body 91 by means of integral studs 92 which extend into shouldered holes 94 in such body and are staked or otherwise riveted over to secure the segments in place. The outer peripheral edge of each contact segment 88 carries a reversely bent tang or finger 89 which is engaged by a wire from the armature windings 86. Desirably, the fingers 89 are thinner than the face wall of the commutator to facilitate hot-staking them to the wires to ensure good electrical contact.

The left end of the unit shown in FIG. 2 is closed by an end bell 100 received in the housing 42 and having a radial wall 101. Its outer peripheral wall 102 forms an abutment seat 103 against the end face of the magnet 80, which is circumferentially complete and continuous except for a tang 81 extending into a slot 83 in the end periphery of the magnet. In the assembled unit, the magnet is held between such seat 103 and the abutment seat 76 on the front pump plate 60. The end bell 100 also forms a delivery opening 104 leading to a socket 105 for the end of a tube 106 which serves as a delivery tube and may also serve as the principal support for the motor-pump unit. The center of the end cap 100 forms a bearing 108 for the shaft 50.

Figure 7:
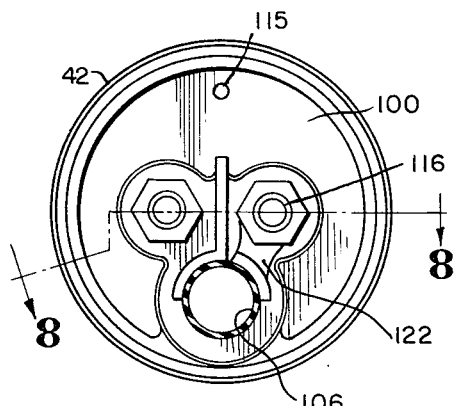
FIG. 7 is an end elevation, from the left of FIG. 2.
Figure 8:
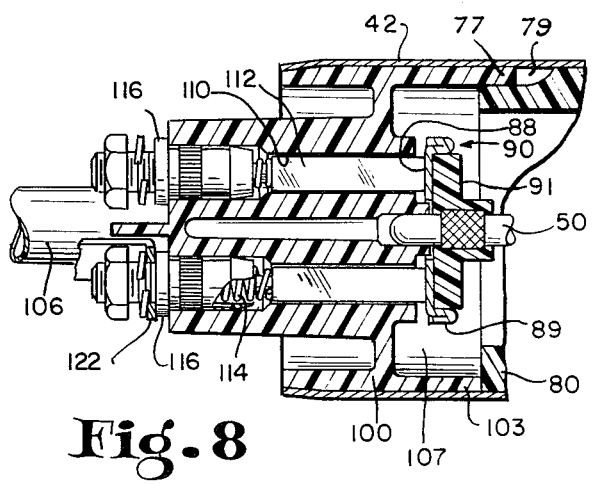
FIG. 8 is a horizontal longitudinal section taken on the line 8—8 of FIG. 7 and showing the brush and commutator assembly of the unit of FIG. 2.

As shown in FIGS. 7 and 8, the end bell 100 forms guides 110 for commutator brushes 112 which make end contact in an axial direction with the face commutator segments 88, and are biased thereagainst by springs 114 received in terminal fittings 115. Such terminals 116 may be press-fitted into enlarged end portions of the guides 110. The brushes 112 and their guides 110 are shown as square in cross section, but other shapes may be used.

The end-bell has a radial wall 101 spaced from the magnet to form an open chamber about the commutator. The brush guides 110 and the walls of the outlet 104 project into such chamber to define a circumferentially discontinuous pocket 107 in the end bell, which aids in purging air from the liquid.

An in-tank fuel pump should be self-priming, and adapted to purge itself of air and fuel vapor. To this end, the inlet collar 56 and inlet passage 54 are disposed at the bottom of the unit in the position of normal use as shown in FIG. 2, and the pump is vented adjacent the top of the unit, as by the vent hole 65 located at the upper portion of the end plate 46, opposite the radially inner ends of the pump blades 70. The motor chamber may be vented to the outside of the assembly through a vent hole 115 at the top of the end bell 100 (FIG. 7). Both vent holes are of small size, sufficient to pass air or gas at a relatively high rate, but insufficient to pass enough liquid to significantly lower the pressure when the unit is full of liquid. Under static conditions, the vent holes permit liquid fuel to enter the unit through the inlet collar 56 and inlet passages 54 and allow any gas present in the unit to escape and be displaced by such liquid, which action will at least partially prime the pump chamber with liquid. In operation, the pump rotor produces a centrifugal separation which tends to throw liquid to the outer periphery of the pump chamber and to displace gas and air toward its inner periphery where it will escape through the vent hole 65. In the motor chamber, any air or vapor will tend to rise to the top and to accumulate in the relatively quiet area adjacent the vent hole 115, through which it will escape back to the tank. Under conditions of no delivery flow through the delivery outlet 104 from the pump chamber, the vent hole 115 serves the further purpose of causing a continuous flow through the motor chamber for cooling purposes.

The motor pump unit described is desirably assembled as follows: The pump parts are first assembled in the housing 42, with the rotor 68 loosely positioned between the pump plates 46 and 60. The un-magnetized magnet 80 is inserted against the abutment seat 76 with its slot 79 over the tank 77, and the armature 86 and shaft 50 assembly is then inserted axially. The tapered leading end of the drive hub 51 enters the central opening of the pump rotor 68, moving it to substantially centered position, and the end of the shaft 50 then enters the bearing 48. The end bell 100 containing the brushes 112 is then inserted in the open end of the housing 42 against the un-magnetized magnet 80, and oriented rotationally to enter the tang 81 in the slot 83. The parts are pressed axially together and against the top ring 44, and while such pressure is maintained, the left end of the housing 42 is crimped into clamping engagement with a conical section 101 at the outer end of the peripheral wall 102 of the end bell 100. This secures the internal parts in fixed position and in predetermined rotational orientation. The magnet is then magnetized while the assembly is held between suitably positioned magnetizing poles which in the embodiment shown may be centered in a diametrical plane through the grooves 79 and 83.

In mounting and connecting the motor pump unit for use, the delivery pipe 106 desirably serves as both the physical support for the unit, and as an electrical ground connection for the motor. In such case, the delivery pipe may carry a bracket 122 which fits over the grounded brush terminal 116 and is secured thereto by a nut. The bracket serves both to make an electrical ground connection and to secure the delivery pipe in place in its seat 105.

In operation, the motor pump unit is mounted adjacent to the bottom of the fuel tank as shown in FIG. 1. Fuel enters through the filter 58 and passes through the inlet 54 to the pump chamber. In such chamber, the liquid is picked up by the pump rotor blades 70 and subjected to a pumping action in which it is carried circumferentially about the chamber in a spiral path, repeatedly circulating into the pump rotor blade spaces and into the regeneration chamber spaces formed by the side cavities 52 and 64. This regenerative circulation builds up the pressure in the liquid until it reaches the stripper blocks 72–73 and is discharged through the outlet 66 into the motor chamber. In the motor chamber, the liquid flows through the open clearance space between the armature and the magnet, to the opposite end of the motor chamber, and thence out the delivery opening 104 to the delivery pipe 106. The total liquid flow through the motor cools and lubricates the parts, and sweeps over the commutator to keep it clean and cool.

Figure 9:
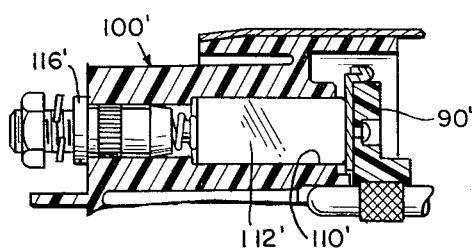
FIG. 9 is a section similar to FIG. 8 but showing a modification using brushes of larger cross section and a commutator of larger diameter.

In the modification shown in FIG. 9, the commutator 90' is larger in diameter than the commutator of FIG. 8 and the brushes 112' are of larger cross-sectional area and are radially wider than the brushes 112 of FIG. 8. This enlargement of the brushes and the commutator is possible because the liquid flows through the inside of the magnet 80 rather than along the outside of such magnet. This flow arrangement permits the peripheral wall 102 of the end bell 100 and its stop flange 103 to be located at the extreme outer periphery of the magnet 80, and avoids the necessity for flow-guiding walls in the space into which the commutator is enlarged in FIG. 8. The increase in brush cross section and commutator face area obtained by this modification reduces the current concentration over the brush contact area of the brush and the commutator, and under otherwise favorable circumstances tends to increase brush life.

What is claimed is:
1. An in-tank motor-pump unit, comprising a coaxial assembly of
   a pump housing defining a generally circular pump chamber, a motor end bell,
   a cylindrical permanent magnet disposed between said pump housing and end bell and cooperating therewith to form a peripheral enclosure,
   an impeller pump rotor in said housing,
   a motor armature disposed within said magnet and having a shaft mounted for rotation in said pump housing and end bell and supporting and driving the pump rotor,
   said magnet being radially spaced from said armature to form a large air gap in the magnetic flux of the motor and thereby to define an open flow passage axially through the motor between the armature and magnet, said pump housing having a delivery outlet in full-flow communication with said flow passage, and a delivery outlet at the opposite end of said enclosure.

2. An in-tank motor-pump unit as in claim 1 with the addition of a cylindrical housing about said pump and motor parts, said cylindrical housing securing said pump housing and end bell and cylindrical magnet axially together and in assembled relation.

3. An in-tank motor-pump unit as in claim 2 in which said magnet is magnetized to form spaced magnetic poles and said housing is composed of magnetically permeable material lying against the periphery of the magnet and forms a magnetic flux return path between said poles.

4. An in-tank motor-pump unit as in claim 1 in which said pump housing and end bell each has an outer peripheral wall extending toward said magnet and into abutting relation with an end face thereof over substantially the entire circumferential extent thereof, and means for clamping the pump housing and end bell axially against the magnet.

5. The method of making an in-tank motor-pump unit as defined in claim 3, which comprises assembling the magnet in the unit in un-magnetized condition, and thereafter magnetizing the magnet to form spaced magnetic poles therein.

6. The method of making an in-tank motor-pump unit as in claim 3, which comprises stacking said pump housing, said magnet in un-magnetized condition, and said end bell in said cylindrical housing, applying axial pressure to said stacked parts and, while maintaining such pressure, deforming said cylindrical housing to secure the stacked parts in assembled relationship, and thereafter magnetizing the magnet through said cylindrical housing.

7. An in-tank motor-pump unit as in claim 1 in which said pump rotor comprises a circumferential series of laterally open impeller blades, the spacing between blades in the series being in accordance with an orderly mathematical progression.

8. An in-tank motor-pump unit as in claim 7 in which the blades are spaced in accordance with an arithmetic progression.

9. An in-tank motor-pump unit as in claim 1 with the addition of a vent hole from said motor enclosure, through said end bell adjacent the top thereof and above the flow passage through the magnet.

10. An in-tank motor-pump unit as in claim 1, in which said pump rotor comprises an annular rim supporting impeller blades thereon and disposed axially between locating end faces on said pump housing, said rotor having a central drive opening, a drive hub on said shaft received in said drive opening and adapted to be freely inserted axially therethrough in assembly, the cross-sectional shapes of said rotor opening and drive hub being geometrically similar regular polyhedrons, the hub being thereby adapted to enter the rotor in assembly in any of a number of relative rotative positions and in operation to support the drive said rotor in coaxial relation with the shaft.

11. An in-tank motor-pump unit as in claim 10 in which the drive portion of said hub and the drive opening of said rotor are hexagonal in cross section.

12. An in-tank motor-pump unit as in claim 1 with the addition of brush guides formed in said end bell and disposed axially on opposite sides of the shaft axis, a face commutator on said armature, and brushes in said guides having end-face engagement with said commutator, said commutator comprising a series of segments independently supported on a commutator body mounted on said shaft, each segment having at least one integral stud projecting from its rear face into a shouldered opening in the commutator body and riveted over against the shoulder thereof.

13. An in-tank motor-pump unit as in claim 1, in which said end bell includes an outer peripheral wall extending into abutting relation with the end of said magnet at the periphery thereof and defining a chamber beyond the end of said magnet, a face-commutator on said armature positioned in said chamber, brush guides formed in said end bell and disposed axially on opposite sides of the shaft axis, and brushes in said guides having end-face engagement with said commutator, the end-bell wall of said chamber being spaced from said commutator, wall means including said brush-guides being formed to project axially of said chamber from said end-bell wall and thereby to define a circumferentially discontinuous pocket in said end bell.

14. An in-tank motor-pump unit as in claim 13, with the addition of a vent hole for said motor chamber extending through said end-bell wall at the top of said circumferentially discontinuous pocket.

15. An in-tank motor-pump unit according to claim 1, in which
said pump chamber is defined by an unobstructed circular peripheral wall and forms annular side regeneration channels in its opposite side walls,
said rotor has a circumferential series of spaced pumping blades in said pumping chamber and extending into running clearance relation with said circular peripheral wall, and
said side regeneration channels having blocking strippers therein at one circumferential position,
said pump housing having an inlet and its outlet circumferentially on opposite sides of said strippers.

16. An in-tank motor-pump unit according to claim 15 in which said pumping blades are spaced from each other in an orderly progression.

17. An in-tank motor-pump unit according to claim 7 in which said spacing progression is in accordance with the formula $S(n) = C + \frac{1}{2}° (n-1)$ where $n$ is the number of the blade in a series, $S(n)$ is the spacing of each blade from its successor in the series, and $C$ is a constant of approximately 10.

References Cited
UNITED STATES PATENTS

| | | | |
|---|---|---|---|
| 3,418,991 | 12/1968 | Shultz et al. | 417—423 X |
| 797,059 | 8/1905 | Hedlund | 417—372 X |
| 3,006,603 | 10/1961 | Caruso et al. | 415—119 X |

ROBERT M. WALKER, Primary Examiner

U.S. Cl. X.R.

222—333; 415—119

UNITED STATES PATENT OFFICE
CERTIFICATE OF CORRECTION

Patent No. 3,676,025　　　　　　　　　Dated July 11, 1972

Inventor(s) John E. Shultz and Wilfred W. Herderhorst

It is certified that error appears in the above-identified patent and that said Letters Patent are hereby corrected as shown below:

Column 4, line 4, change "(Fig. 2-4)" to -- (Figs. 2-4) --.
Column 7, line 1, change "magnetic flux" to -- magnetic flux path --;
　　　　line 64, change "support the drive" to -- support and drive --.

Signed and sealed this 2nd day of January 1973.

(SEAL)
Attest:

EDWARD M. FLETCHER, JR.　　　　　　　ROBERT GOTTSCHALK
Attesting Officer　　　　　　　　　　Commissioner of Patents